US012799929B2

(12) United States Patent
Son et al.

(10) Patent No.: US 12,799,929 B2
(45) Date of Patent: Nov. 17, 2026

(54) RECIPROCATING COMPRESSOR

(71) Applicant: LG ELECTRONICS INC., Seoul (KR)

(72) Inventors: Youngboo Son, Seoul (KR); Mingeon Jeong, Seoul (KR); Kyeongho Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/851,185

(22) PCT Filed: Nov. 3, 2022

(86) PCT No.: PCT/KR2022/017173

§ 371 (c)(1),
(2) Date: Sep. 26, 2024

(87) PCT Pub. No.: WO2023/200061

PCT Pub. Date: Oct. 19, 2023

(65) Prior Publication Data

US 2025/0215867 A1 Jul. 3, 2025

(30) Foreign Application Priority Data

Apr. 14, 2022 (KR) ........................ 10-2022-0046273

(51) Int. Cl.
*F04B 19/22* (2006.01)
*F04B 39/00* (2006.01)
(Continued)

(52) U.S. Cl.
CPC .......... *F04B 19/22* (2013.01); *F04B 39/0044* (2013.01); *F04B 53/003* (2013.01);
(Continued)

(58) Field of Classification Search
CPC ....... F04B 53/003; F04B 39/0044; F16F 1/13; F16F 1/125; F16F 1/126
(Continued)

(56) References Cited

U.S. PATENT DOCUMENTS 2,102,403 A * 12/1937 Bixler .................. F25B 31/023 417/281
2,222,724 A * 11/1940 Rogers .................. F25D 23/006 403/229
(Continued)

FOREIGN PATENT DOCUMENTS

JP 2013-194537 9/2013
KR 20-2000-0014963 7/2000
(Continued)

OTHER PUBLICATIONS

Machine Translation of KR20080064214; 2008.*
International Search Report dated Jul. 19, 2023 issued in Application No. PCT/KR2022/017173.

*Primary Examiner* — Christopher S Bobish
(74) *Attorney, Agent, or Firm* — KED & ASSOCIATES, LLP

(57) ABSTRACT

A reciprocating compressor is provided. The reciprocating compressor includes a case, a drive motor disposed in the case, a rotary shaft rotatably connected to the drive motor, a compression mechanism configured to compress a refrigerant by the rotary shaft, a plurality of support members configured to support the compression mechanism, and a plurality of elastic assemblies, each of which is disposed between each of the plurality of support members and the case. The elastic assembly includes a first mounting member disposed between the support member and the case, a first elastic member disposed between the support member and
(Continued)

the first mounting member, and a second elastic member disposed between the first mounting member and the case.

17 Claims, 13 Drawing Sheets

(51) Int. Cl.
*F04B 53/00* (2006.01)
*F16F 1/12* (2006.01)
*F16F 1/13* (2006.01)

(52) U.S. Cl.
CPC .............. *F16F 1/125* (2013.01); *F16F 1/126* (2013.01); *F16F 1/13* (2013.01)

(58) Field of Classification Search
USPC .................................. 417/363; 267/169, 170
See application file for complete search history.

(56) References Cited

U.S. PATENT DOCUMENTS 2,932,474 A * 4/1960 Becker ...................... F16F 1/08 267/140.3
3,044,688 A * 7/1962 Frank .................. F04B 39/0044 417/419
3,141,660 A * 7/1964 Clarke ...................... F16F 1/13 267/166
3,531,069 A * 9/1970 Dubberley ............ F16F 15/067 267/168
4,830,348 A * 5/1989 Seyler ....................... F16F 1/13 267/136
5,342,179 A * 8/1994 Dreiman ................... F16F 3/02 417/363
5,772,191 A * 6/1998 Nakano ................... F16F 1/125 267/179
5,906,362 A * 5/1999 Takehira ........... F16F 15/12326 267/179
6,485,271 B1 * 11/2002 Tack ................... F04B 39/0044 417/363
6,572,087 B2 * 6/2003 Schleinitz ................. F16F 3/10 267/152
6,832,899 B2 * 12/2004 Puff ...................... F04B 39/127 417/363
7,585,161 B2 * 9/2009 Noh .................... F04B 39/0061 417/540
8,616,538 B2 * 12/2013 Al-Dahhan ............... F16F 9/58 267/220
8,651,831 B2 * 2/2014 Yagi .................... F04B 39/0044 417/423.15
8,888,468 B2 * 11/2014 Maganhoto ........... F04B 39/127 417/363
2004/0183243 A1 * 9/2004 Chen ......................... F16F 1/13 267/286
2008/0232984 A1 * 9/2008 Lee ....................... F04B 39/121 417/363
2021/0363982 A1 * 11/2021 Schögler ............. F04B 39/0284

FOREIGN PATENT DOCUMENTS

KR 10-2008-0064214 7/2008
KR 10-2016-0039199 4/2016
KR 10-2092678 3/2020

* cited by examiner

【FIG. 1】
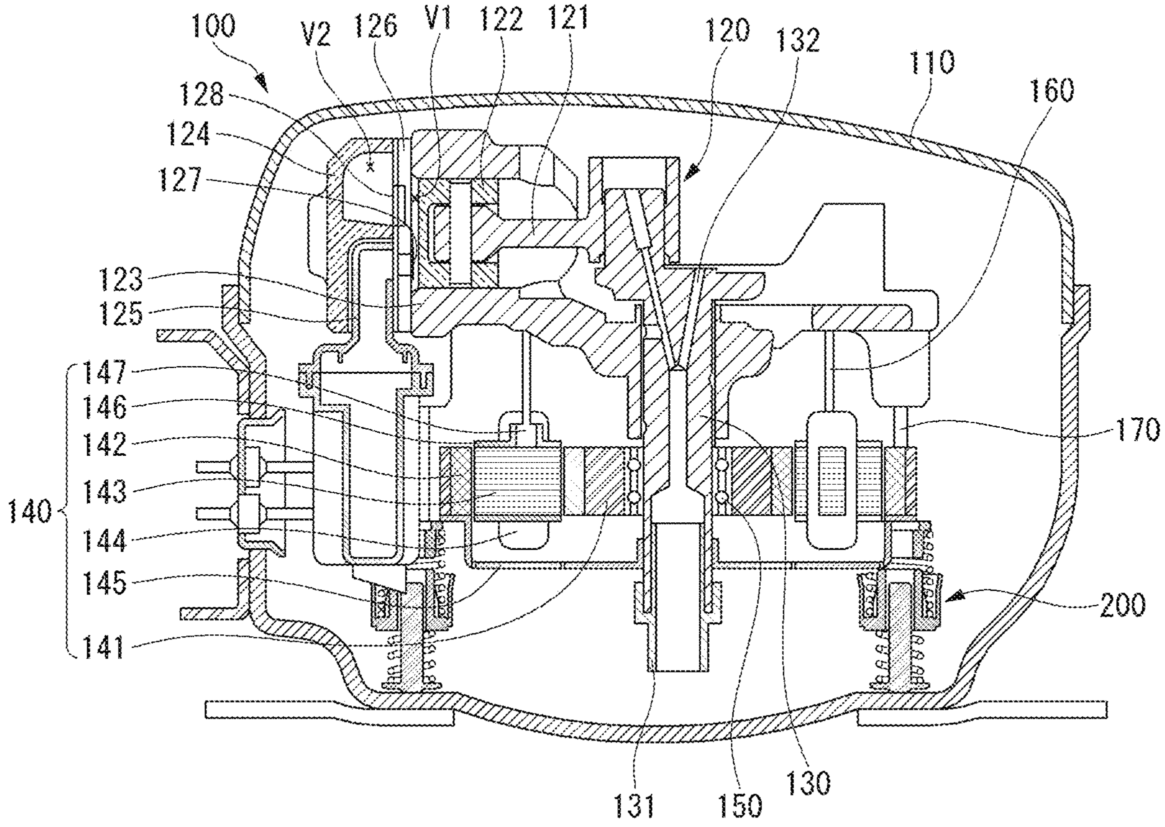

【FIG. 2】
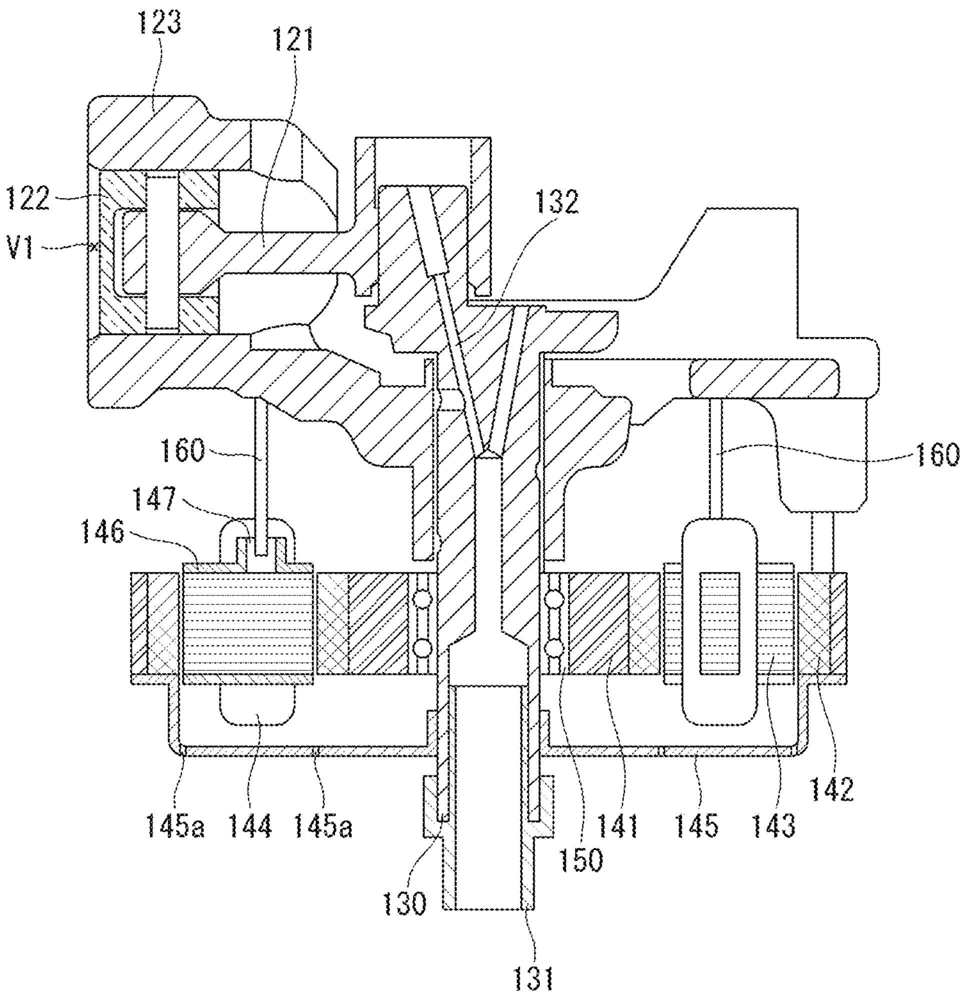

【FIG. 3】
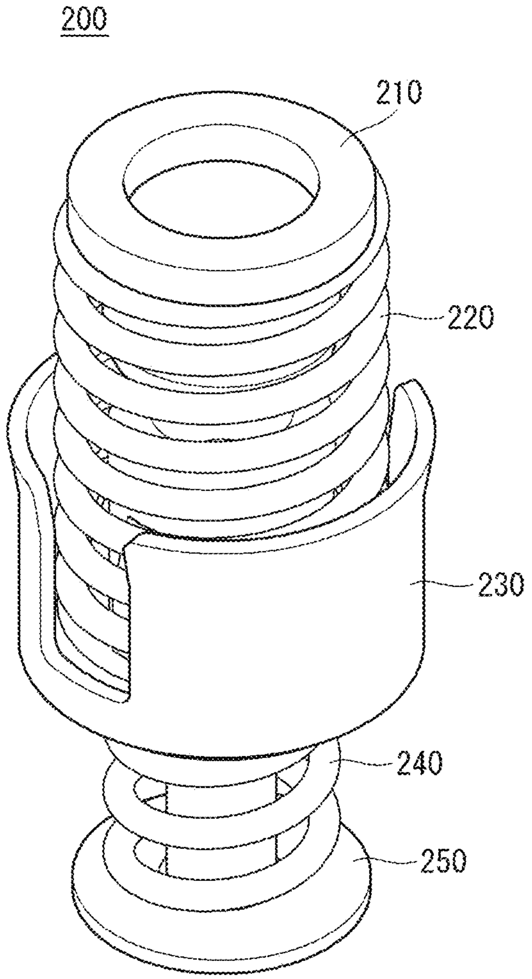

【FIG. 4】
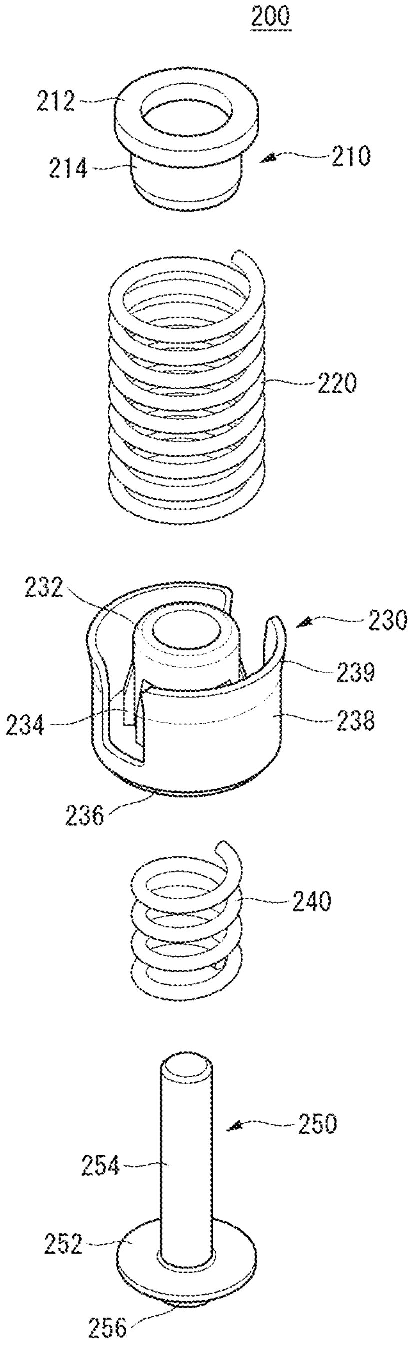

【FIG. 5】
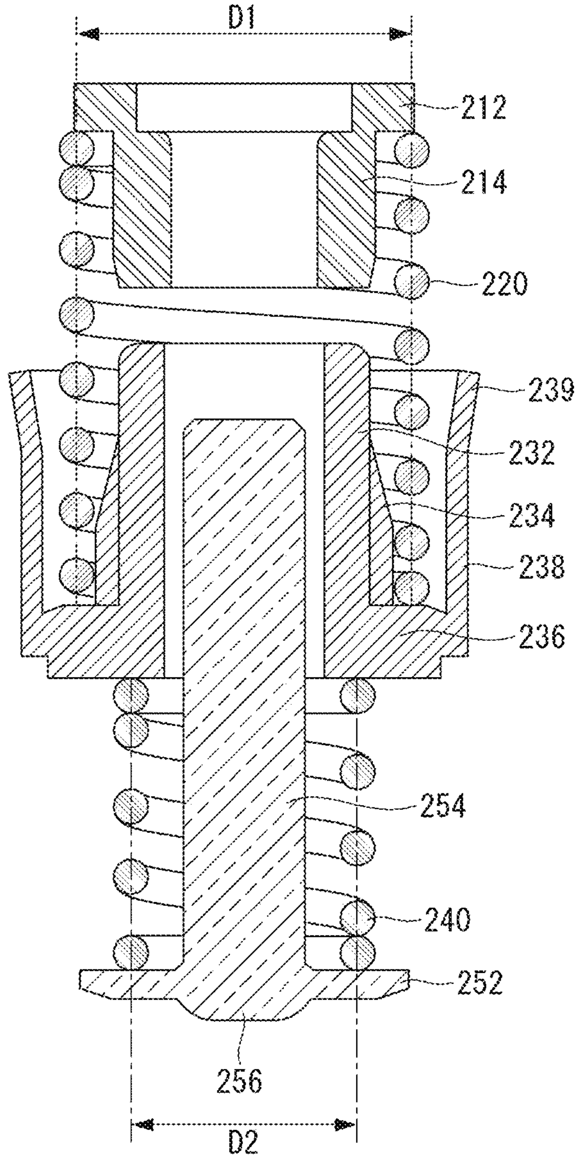

【FIG. 6】
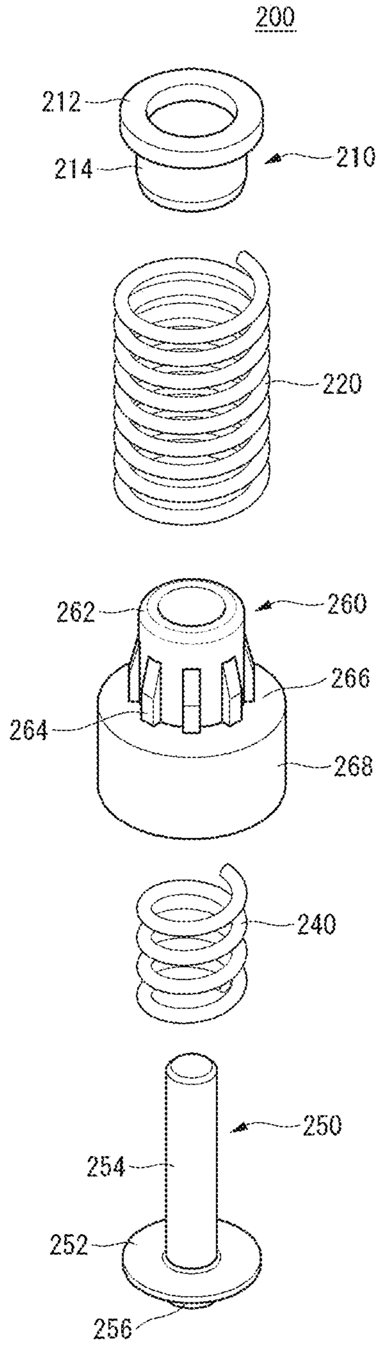

【FIG. 7】
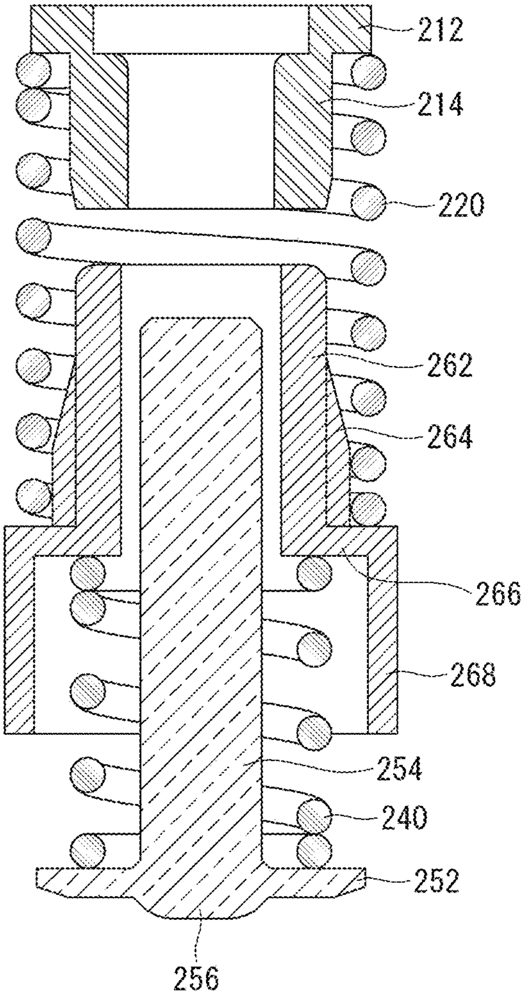

【FIG. 8】
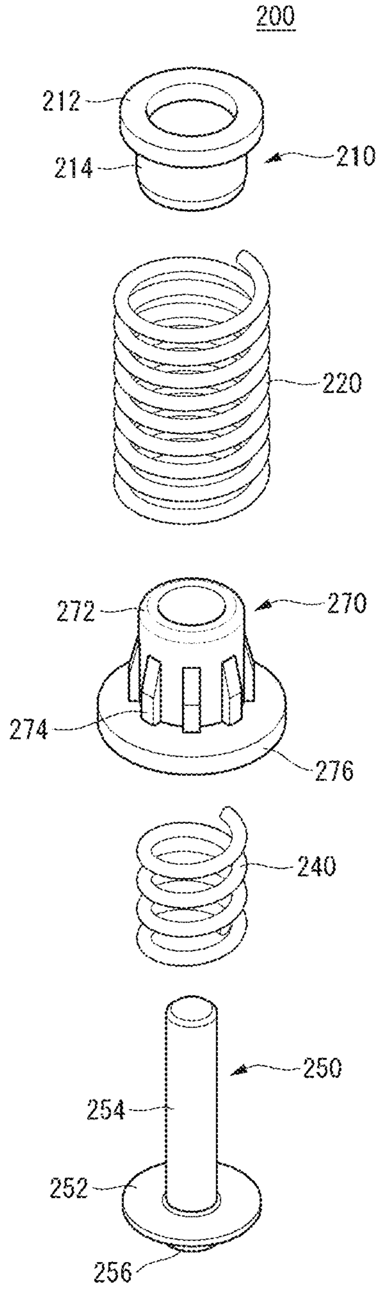

【FIG. 9】
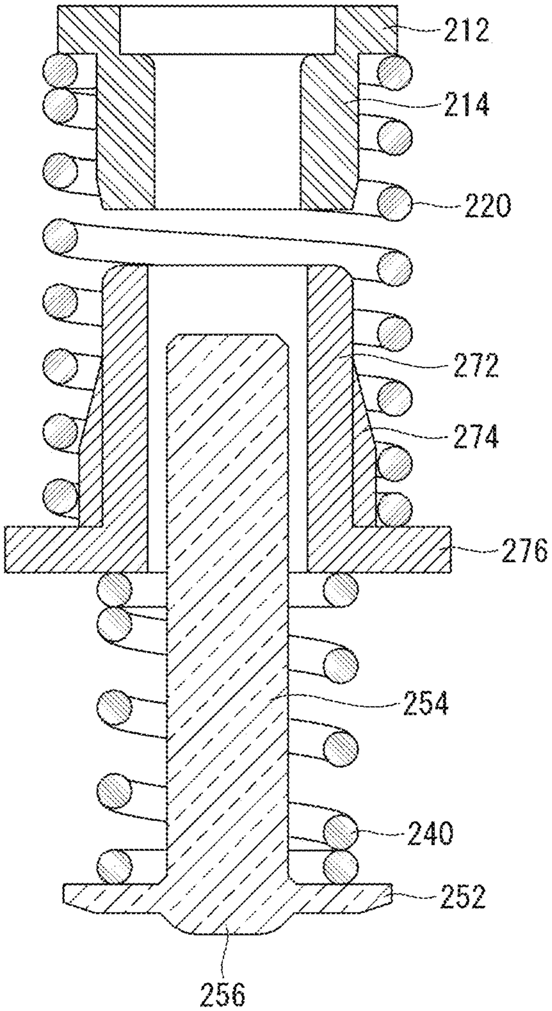

【FIG. 10】
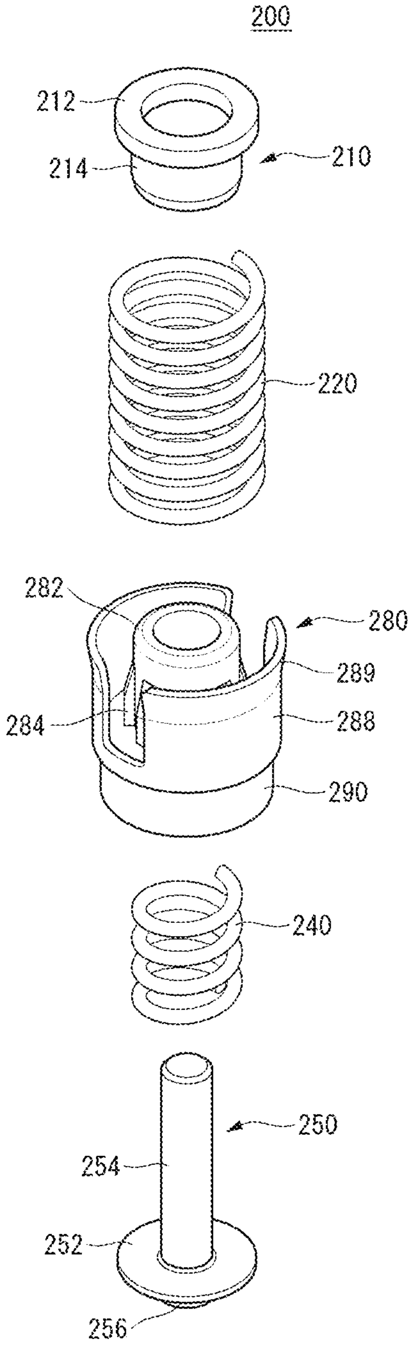

【FIG. 11】
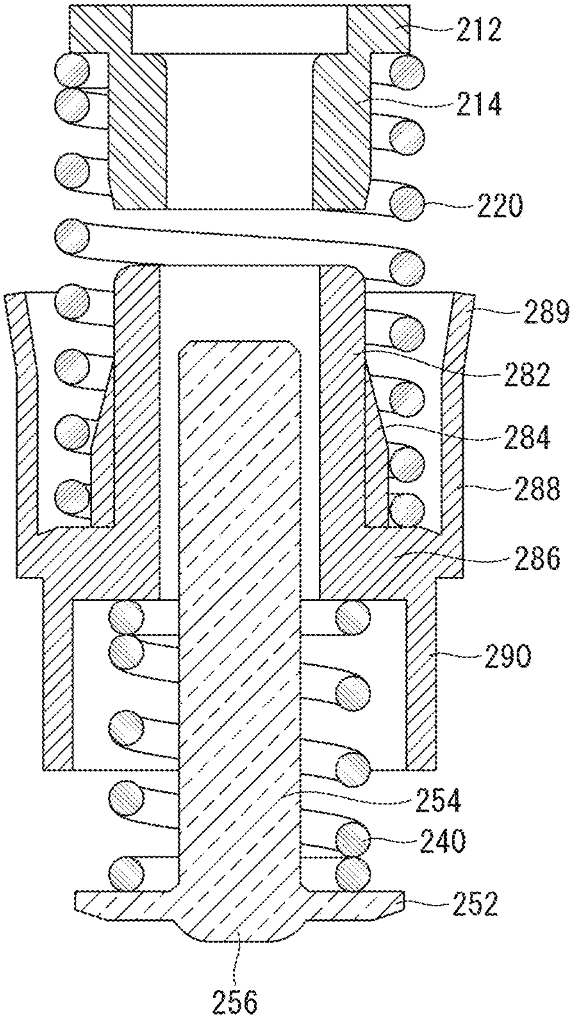

【FIG. 12】
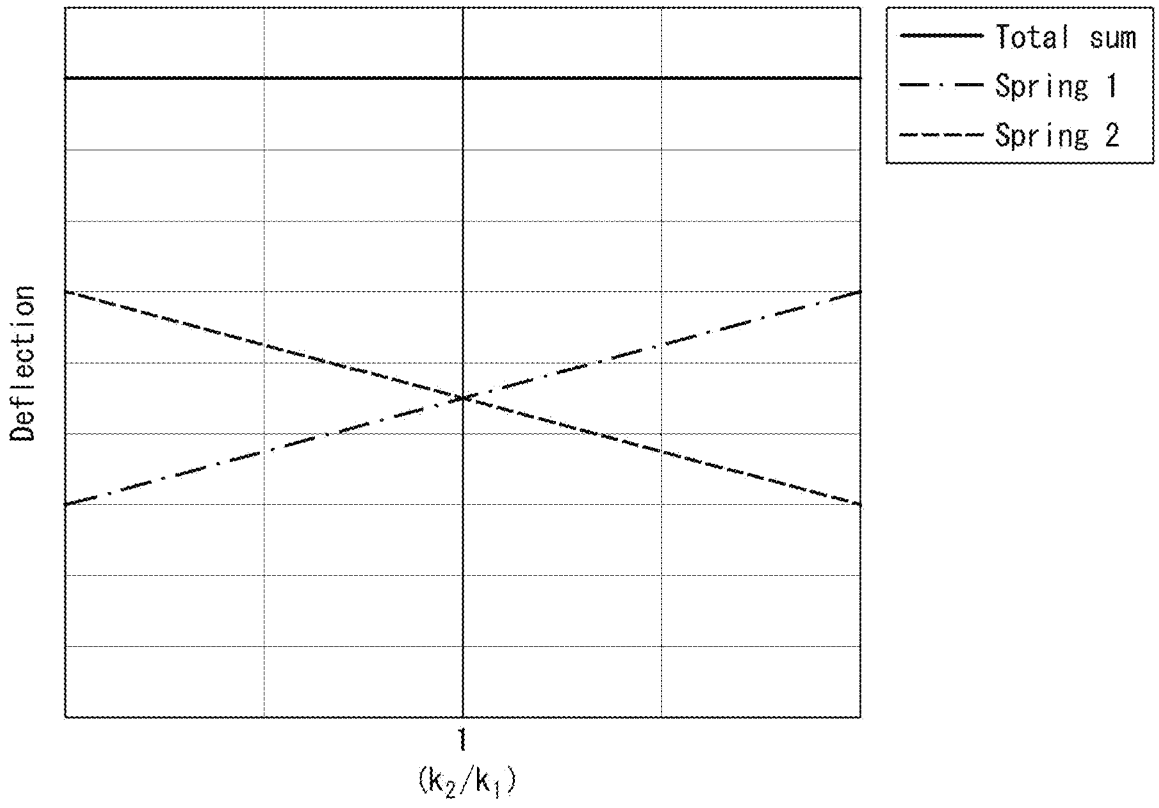
【FIG. 13】
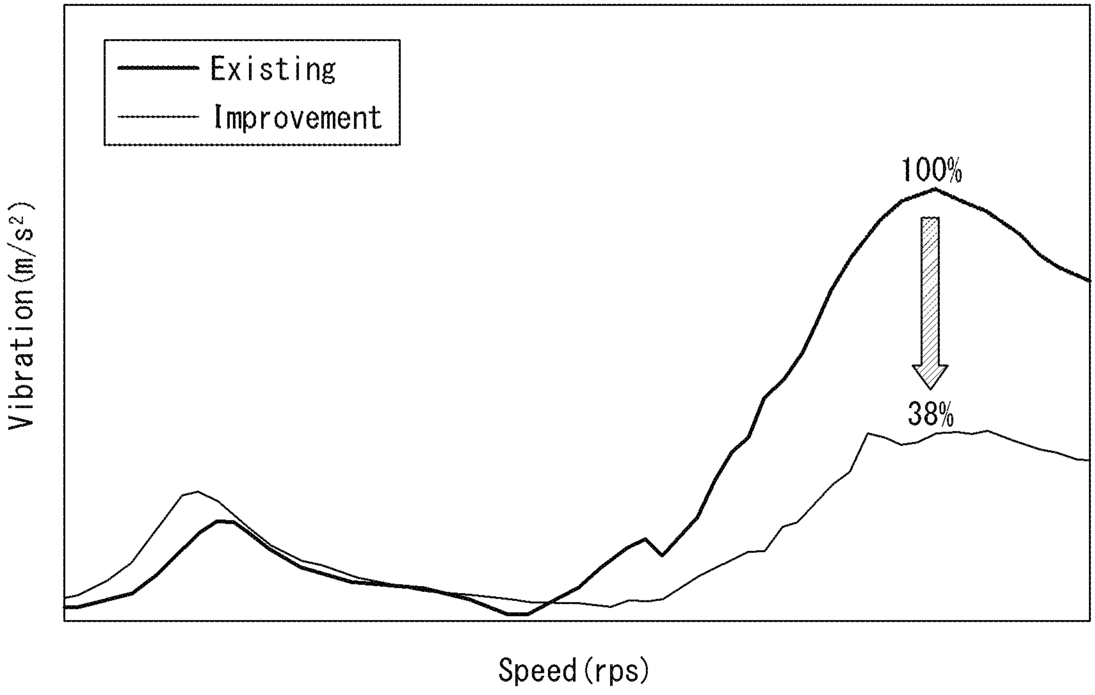

【FIG. 14】
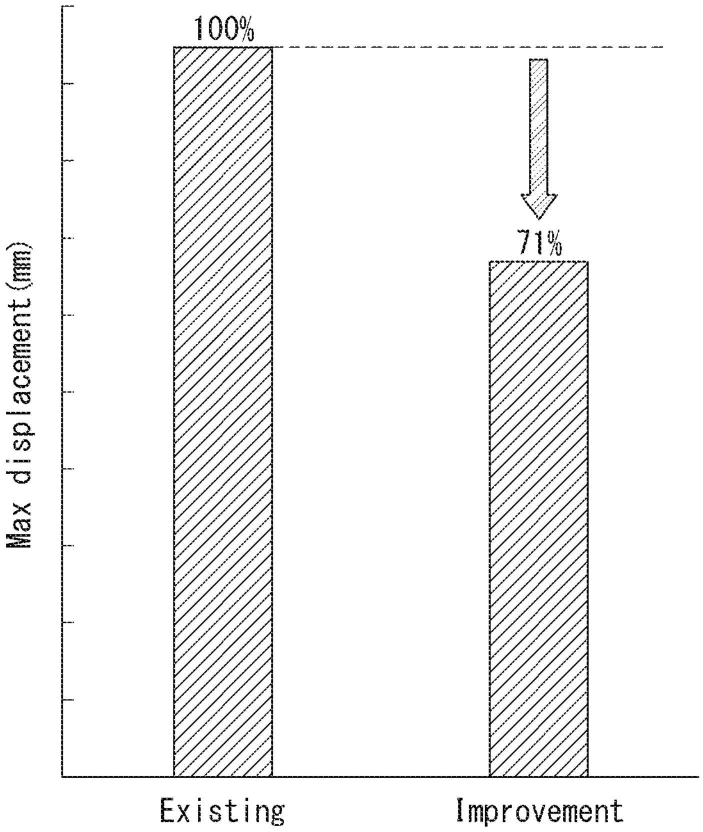

RECIPROCATING COMPRESSOR

CROSS-REFERENCE TO RELATED PATENT APPLICATIONS

This application is a U.S. National Stage Application under 35 U.S.C. § 371 of PCT Application No. PCT/KR2022/017173, filed Nov. 3, 2022, which claims priority to Korean Patent Application No. 10-2022-0046273, filed Apr. 14, 2022, whose entire disclosures are hereby incorporated by reference.

TECHNICAL FIELD

The present disclosure relates to a reciprocating compressor. More specifically, the present disclosure relates to a reciprocating compressor that compresses a refrigerant by a linear reciprocating motion of a piston.

BACKGROUND ART

In general, a compressor refers to a device that is configured to receive power from a power generator such as a motor or a turbine and compress a working fluid such as air or refrigerant. Specifically, compressors are widely applied to the whole industry or home appliances, particularly, a steam compression refrigeration cycle (hereinafter, referred to as "refrigeration cycle").

The compressors may be classified into a reciprocating compressor, a rotary compressor, and a scroll compressor depending on a method of compressing the refrigerant.

The reciprocating compressor is configured such that a compression space is formed between a piston and a cylinder and the piston linearly reciprocates to compress a fluid. The rotary compressor is configured such that a fluid is compressed by a roller that is eccentrically rotated in a cylinder. The scroll compressor is configured such that a pair of scrolls formed in a spiral shape are engaged and rotated to compress a fluid.

The reciprocating compressor may be classified into a vibrating type and a connecting type depending on a driving method of the piston. The vibrating reciprocating compressor is configured such that a piston is connected to a mover of a drive motor to vibrate and reciprocates in a cylinder to compress a refrigerant. The connected reciprocating compressor is configured such that a connecting rod is coupled to a rotating shaft of a drive motor, and a piston is coupled to the connecting rod to convert a rotational force of the drive motor into a linear motion of the piston.

The present disclosure relates to a connected reciprocating compressor, hereinafter referred to as a 'reciprocating compressor'.

In general, the reciprocating compressor applies a structure in which a compression mechanism is supported downward by a plurality of elastic assemblies consisting of a single spring.

In this case, there was a problem that the reciprocating compressor was vulnerable to impulsive force acting in a vertical direction when it was running or stopped, and excessive deflection in a transverse direction occurred during operation.

DISCLOSURE

Technical Problem

An object of the present disclosure is to provide a reciprocating compressor that can reduce vertical vibrations compared to using a single spring.

Another object of the present disclosure is to provide a reciprocating compressor that can improve structural stability of an elastic assembly.

Another object of the present disclosure is to provide a reciprocating compressor that can prevent damage to the product due to buckling by resolving deflection instability of a second elastic member disposed below a first elastic member.

Another object of the present disclosure is to provide a reciprocating compressor that can suppress excessive transverse vibration of a first elastic member.

Another object of the present disclosure is to provide a reciprocating compressor that can prevent a first elastic member from being excessively restrained in a transverse direction while improving assemblability of the product.

Another object of the present disclosure is to provide a reciprocating compressor that can stably guide a lower area of a first guide member.

Another object of the present disclosure is to provide a reciprocating compressor that can improve the assemblability between a first elastic member and a first mounting member.

Another object of the present disclosure is to provide a reciprocating compressor that can guide longitudinal compression or tension of an elastic assembly.

Another object of the present disclosure is to provide a reciprocating compressor that can reduce a natural frequency and improve vibration stability during vertical vibration of an elastic assembly.

Another object of the present disclosure is to provide a reciprocating compressor that can prevent each component from colliding with each other in a compressed state of an elastic assembly.

Another object of the present disclosure is to provide a reciprocating compressor that can reduce wear between components that occurs when an elastic assembly is compressed or tensioned.

Another object of the present disclosure is to provide a reciprocating compressor that can suppress excessive transverse vibration of a second elastic member.

Technical Solution

In order to achieve the above-described objects, in one aspect of the present disclosure, there is provided a reciprocating compressor comprising a case, a drive motor disposed in the case, a rotating shaft rotatably connected to the drive motor, a compression mechanism configured to compress a refrigerant by the rotating shaft, a plurality of support members configured to support the compression mechanism, and a plurality of elastic assemblies, each of which is disposed between each of the plurality of support members and the case.

In this case, the elastic assembly may include a first mounting member disposed between the support member and the case, a first elastic member disposed between the support member and the first mounting member, and a second elastic member disposed between the first mounting member and the case.

Through this, the present disclosure can reduce a vertical vibration compared to using a single spring.

A diameter of the first elastic member may be greater than a diameter of the second elastic member.

Through this, the present disclosure can improve structural stability of the elastic assembly of the reciprocating compressor.

A stiffness of the second elastic member may be equal to or greater than a stiffness of the first elastic member.

Through this, the present disclosure can prevent damage to the product due to buckling by resolving deflection instability of the second elastic member disposed below the first elastic member.

The first mounting member may include a mounting portion including an upper surface on which a lower surface of the first elastic member is mounted, and a lower surface on which an upper surface of the second elastic member is mounted, and a first stopper that extends upward from a radially outer side of the mounting portion and is radially spaced from an outer surface of the first elastic member.

Through this, the present disclosure can suppress excessive transverse vibration of the first elastic member.

The first stopper may include a bent portion that have an increasing radius as it goes upward.

Through this, the present disclosure can prevent the first elastic member from being excessively restrained in a transverse direction while improving assemblability of the product.

The first mounting member may include a first guide member that extends upward in a central area of the mounting portion and is in contact with an inner surface of the first elastic member. The first mounting member may further include a protrusion that protrudes radially from an outer surface of the first guide member and is in direct contact with the inner surface of the first elastic member.

Through this, the present disclosure can stably guide a lower area of the first elastic member.

The protrusion may be formed adjacent to a central area of the first guide member as at least a portion of the protrusion goes upward.

Through this, the present disclosure can improve the assemblability between the first elastic member and the first mounting member.

The elastic assembly may include a second mounting member disposed between the second elastic member and the case. The second mounting member may include a first flange portion on which a lower end of the second elastic member is mounted, and a second guide member that extends upward in a central area of the first flange portion and penetrates the first guide member.

Through this, the present disclosure can guide longitudinal compression or tension of the elastic assembly.

The second mounting member may include a convex portion that is convexly formed on a lower surface of the first flange portion and is in contact with an inner surface of the case.

Through this, the present disclosure can reduce a natural frequency and improve vibration stability during vertical vibration of the elastic assembly.

An upper end of the second guide member may be disposed below an upper end of the first guide member.

Through this, the present disclosure can prevent each component from colliding with each other in a compressed state of the elastic assembly.

The elastic assembly may include a third mounting member disposed between the first elastic member and the support member. The third mounting member may include a second flange portion on which an upper end of the first elastic member is mounted, and a third guide member extending downward in a central area of the second flange portion. The second guide member may vertically overlap with an inner area of the third guide member.

Through this, the present disclosure can stably support an upper part of the first elastic member and prevent each component from colliding with each other in a compressed state of the elastic assembly.

An oil stored in a lower part of the case may be supplied between the first guide member and the second guide member. An outer surface of the second guide member may slide on an inner surface of the first guide member.

Through this, the present disclosure can reduce wear between components that occurs when the elastic assembly is compressed or tensioned.

The first mounting member may include a second stopper that extends downward from the radially outer side of the mounting portion and is radially spaced from an outer surface of the second elastic member. In this case, the second stopper may be disposed closer to a central area of the first mounting member than the first stopper.

Through this, the present disclosure can suppress excessive transverse vibration of the second elastic member.

Advantageous Effects

The present disclosure can provide a reciprocating compressor that can reduce vertical vibrations compared to using a single spring.

The present disclosure can provide a reciprocating compressor that can improve structural stability of an elastic assembly.

The present disclosure can provide a reciprocating compressor that can prevent damage to the product due to buckling by resolving deflection instability of a second elastic member disposed below a first elastic member.

The present disclosure can provide a reciprocating compressor that can suppress excessive transverse vibration of a first elastic member.

The present disclosure can provide a reciprocating compressor that can prevent a first elastic member from being excessively restrained in a transverse direction while improving assemblability of the product.

The present disclosure can provide a reciprocating compressor that can stably guide a lower area of a first guide member.

The present disclosure can provide a reciprocating compressor that can improve the assemblability between a first elastic member and a first mounting member.

The present disclosure can provide a reciprocating compressor that can guide longitudinal compression or tension of an elastic assembly.

The present disclosure can provide a reciprocating compressor that can reduce a natural frequency and improve vibration stability during vertical vibration of an elastic assembly.

The present disclosure can provide a reciprocating compressor that can prevent each component from colliding with each other in a compressed state of an elastic assembly.

The present disclosure can provide a reciprocating compressor that can reduce wear between components that occurs when an elastic assembly is compressed or tensioned.

The present disclosure can provide a reciprocating compressor that can suppress excessive transverse vibration of a second elastic member.

DESCRIPTION OF DRAWINGS

FIG. 1 is a cross-sectional view of a reciprocating compressor according to a first embodiment of the present disclosure.

FIG. 2 is an enlarged view of a portion of FIG. 1.

FIG. 3 is a perspective view of an elastic assembly of a reciprocating compressor according to a first embodiment of the present disclosure.

FIG. 4 is an exploded perspective view of an elastic assembly of a reciprocating compressor according to a first embodiment of the present disclosure.

FIG. 5 is a cross-sectional view of an elastic assembly of a reciprocating compressor according to a first embodiment of the present disclosure.

FIG. 6 is an exploded perspective view of an elastic assembly of a reciprocating compressor according to a second embodiment of the present disclosure.

FIG. 7 is a cross-sectional view of an elastic assembly of a reciprocating compressor according to a second embodiment of the present disclosure.

FIG. 8 is an exploded perspective view of an elastic assembly of a reciprocating compressor according to a third embodiment of the present disclosure.

FIG. 9 is a cross-sectional view of an elastic assembly of a reciprocating compressor according to a third embodiment of the present disclosure.

FIG. 10 is an exploded perspective view of an elastic assembly of a reciprocating compressor according to a fourth embodiment of the present disclosure.

FIG. 11 is a cross-sectional view of an elastic assembly of a reciprocating compressor according to a fourth embodiment of the present disclosure.

FIG. 12 is a graph illustrating an amount of deflection of a first elastic member and a second elastic member depending on stiffness of the first elastic member and the second elastic member in a reciprocating compressor according to embodiments of the present disclosure.

FIG. 13 is a graph illustrating vibration depending on an operating speed in an existing reciprocating compressor and a reciprocating compressor according to embodiments of the present disclosure.

FIG. 14 is a graph illustrating a maximum transverse displacement at the stop of an existing reciprocating compressor and a reciprocating compressor according to embodiments of the present disclosure.

MODE FOR INVENTION

Reference will now be made in detail to embodiments of the present disclosure, examples of which are illustrated in the accompanying drawings. Wherever possible, the same reference numbers will be used throughout the drawings to refer to the same or like parts.

It should be understood that when a component is described as being "connected to" or "coupled to" other component, the component may be directly connected or coupled to the other component or intervening component(s) may be present.

It will be noted that a detailed description of known arts will be omitted if it is determined that the detailed description of the known arts can obscure embodiments of the present disclosure. The accompanying drawings are used to help easily understand various technical features and it should be understood that embodiments presented herein are not limited by the accompanying drawings. As such, the present disclosure should be understood to extend to any alterations, equivalents and substitutes in addition to those which are particularly set out in the accompanying drawings.

In addition, a term of "disclosure" may be replaced by terms such as document, specification, description, etc.

FIG. 1 is a cross-sectional view of a reciprocating compressor according to an embodiment of the present disclosure. FIG. 2 is an enlarged view of a portion of FIG. 1. FIG. 3 is a perspective view of an elastic assembly of a reciprocating compressor according to a first embodiment of the present disclosure. FIG. 4 is an exploded perspective view of an elastic assembly of a reciprocating compressor according to a first embodiment of the present disclosure. FIG. 5 is a cross-sectional view of an elastic assembly of a reciprocating compressor according to a first embodiment of the present disclosure.

Referring to FIGS. 1 to 5, a reciprocating compressor 100 according to an embodiment of the present disclosure may include a case 110, a compression mechanism 120, a rotating shaft 130, a drive motor 140, a bearing 150, a fixed fastening member 160, a support member 170, and an elastic assembly 200, but may be implemented except for some of these components and may not exclude other additional components.

The case 110 may form an appearance of the reciprocating compressor 100. The compression mechanism 120, the rotating shaft 130, the drive motor 140, the bearing 150, the fixed fastening member 160, the support member 170, and the elastic assembly 200 may be disposed in the case 110. The compression mechanism 120 for compressing a refrigerant to be sucked may be disposed in an upper area inside the case 110, and the rotating shaft 130 and the drive motor 140 that are connected to the compression mechanism 120 may be disposed below the compression mechanism 120.

The drive motor 140 may be disposed in the case 110. The drive motor 140 may be fixed in the case 110. The drive motor 140 may generate a rotational force. The drive motor 140 may transmit the rotational force to the compression mechanism 120 to compress the refrigerant. The drive motor 140 may be connected to the rotating shaft 130. As the rotating shaft 130 rotates by the drive of the drive motor 140, the refrigerant may be compressed within the compression mechanism 120.

The drive motor 140 may include rotors 141 and 142, a stator 143, and a coil 144 wound around the stator 143. The stator 143 may be formed by stacking a plurality of core plates. A first rotor 141 may be rotatably disposed inside the stator 143, and a second rotor 142 may be rotatably disposed outside the stator 143. The first rotor 141 may be coupled to the rotating shaft 130 through the bearing 150. The second rotor 142 may be coupled to the rotating shaft 130 through a rotor plate 145. When power is applied to the coil 144, the rotors 141 and 142 may rotate the rotating shaft 130 by interaction with the stator 143.

The first rotor 141 and the second rotor 142 may selectively drive. Hence, this enables efficient operation and reduces power consumption by controlling the drive depending on an operation section.

A gap may be formed between the stator 143 and the first rotor 141, and a gap may be formed between the stator 143 and the second rotor 142. The rotor plate 145 may include a through hole 145*a* formed at each of positions corresponding to the gap formed between the stator 143 and the first rotor 141 and the gap formed between the stator 143 and the second rotor 142. A gap liner (not shown) may be inserted through the through hole 145*a* so that the gap formed between the stator 143 and the first rotor 141 and the gap formed between the stator 143 and the second rotor 142 have a constant radial interval.

The drive motor 140 may be fixed to a cylinder 123 by the fixed fastening member 160. The stator 143 of the drive motor 140 may be fixed to the cylinder 123 by the fixed fastening member 160. The fixed fastening member 160 may extend in a vertical direction. The fixed fastening member 160 may be inserted into and coupled to a protruding portion 147 disposed on the stator 143. The stator 143 and the protruding portion 147 may be formed of different materials. In this case, an insulator 146 may be formed on an upper surface of the stator 143 for insulation of the stator 153.

The compression mechanism 120 may receive the rotational force from the drive motor 140 to compress the refrigerant. The compression mechanism 120 may compress and discharge the sucked refrigerant. The compression mechanism 120 may include the cylinder 123, a connecting rod 121, a piston 122, a valve assembly 126, a suction valve 127, a suction muffler 125, a discharge valve 128, and a discharge cover 124.

The cylinder 123 may form a compression space V1 and may be fixed in the case 110. The refrigerant sucked into the compression space V1 may be compressed by a reciprocating motion of the piston 122 and then discharged to the outside.

The connecting rod 121 may be rotatably connected to the rotating shaft 130. The connecting rod 121 may be connected to the piston 122. The connecting rod 121 may convert a rotation by the drive motor 140 into a linear reciprocating motion.

The piston 122 may be rotatably connected to the connecting rod 121. The piston 122 may linearly reciprocate in the cylinder 123. The piston 122 may compress the refrigerant in the compression space V1.

The valve assembly 126 may be coupled to the cylinder 123. The valve assembly 126 may be coupled to a tip of the cylinder 123. The valve assembly 126 may include a suction hole and a discharge hole. An embodiment of the present disclosure describes that the valve assembly 126 is formed in a plate shape, by way of example, but is not limited thereto. The suction hole of the valve assembly 126 may communicate with the suction muffler 125 to suction the refrigerant. The discharge hole of the valve assembly 126 may communicate with the discharge cover 124 to discharge the compressed refrigerant.

The suction valve 127 may be coupled to the valve assembly 126. The suction valve 127 may be coupled to one side of the valve assembly 126. The suction valve 127 may be disposed inside the valve assembly 126. For example, the suction valve 127 may be disposed between the valve assembly 126 and the cylinder 123. The suction valve 127 may open and close the suction hole of the valve assembly 126.

The discharge valve 128 may be coupled to the valve assembly 126. The discharge valve 128 may be coupled to other side of the valve assembly 126. The discharge valve 128 may be disposed outside the valve assembly 126. For example, the discharge valve 128 may be disposed between the valve assembly 126 and the discharge cover 124. The discharge valve 128 can open and close the discharge hole of the valve assembly 126.

The suction muffler 125 may be coupled to the valve assembly 126. The suction muffler 125 may be coupled to the other side of the valve assembly 126. The suction muffler 125 may be coupled to the outside of the valve assembly 126. The suction muffler 125 may communicate with a suction hole of the suction muffler 135. The suction muffler 125 may be coupled with the discharge cover 124. The suction muffler 125 may be fitted to the discharge cover 124.

The discharge cover 124 may be coupled to the valve assembly 126. The discharge cover 124 may be coupled to the other side of the valve assembly 126. The discharge cover 124 may communicate with the discharge hole of the valve assembly 126. The discharge cover 124 may form the discharge space V2. The refrigerant compressed by the piston 122 may be introduced into the discharge space V2 through the discharge hole, and the refrigerant introduced into the discharge space V2 may be discharged to the outside.

The rotating shaft 130 may extend in an up-down direction. The rotating shaft 130 may extend in the vertical direction. The rotating shaft 130 may be disposed in the case 110. The rotating shaft 130 may be connected to the drive motor 140. The rotating shaft 130 may be connected to the compression mechanism 120. The rotating shaft 130 may rotate by the drive motor 140 to transmit a rotational force for compressing the refrigerant to the compression mechanism 120.

When the rotating shaft 130 rotates, an oil feeder 131 provided at a lower end of the rotating shaft 130 may pump oil stored in the case 110, a part of the oil may be supplied to a bearing surface while being sucked up through an oil flow path 132 of the rotating shaft 130, and a part of the oil may be scattered at an upper end of the rotating shaft 130 and supplied between the cylinder 123 and the piston 122.

The bearing 150 may be coupled to the rotating shaft 130. The bearing 150 may be a one-way bearing. The bearing 150 may be disposed on an outer circumferential surface of the rotating shaft 130. The bearing 150 may be disposed between the rotating shaft 130 and the first rotor 141. The bearing 150 may transmit only the rotational force generated by one-direction rotation of the first rotor 141 to the rotating shaft 130. For example, the first rotor 141 may rotate clockwise or counterclockwise by interaction with the stator 143, and the bearing 150 may transmit a rotational force only for clockwise (forward) rotation to the rotating shaft 130 and may not transmit a rotational force for counterclockwise (reverse) rotation to the rotating shaft 130. Through this, while both the first rotor 141 and the second rotor 142 rotate in the forward direction or only the second rotor 142 rotates in the reverse direction, the bearing 150 can transmit the rotational force to the rotating shaft 130 to implement two driving modes.

The support member 170 may support the compression mechanism 120. The support member 170 may support a lower part of the compression mechanism 120. The support member 170 may extend in the vertical direction. The support member 170 may be formed in a cylindrical shape, but is not limited thereto. For example, the support member 170 may have a polygonal cross section. An upper area of the support member 170 may be coupled to the lower part of the compression mechanism 120, and a lower area of the support members 170 may be coupled to an upper area of the elastic assembly 200. For example, an upper part of the support member 170 may be bolted to a lower area of the compression mechanism 120, and a lower part of the support members 170 may be bolted to the upper area of the elastic assembly 200.

The support member 170 may include a plurality of support members. An embodiment of the present disclosure describes that four support members are provided, by way example, but is not limited thereto. The number of support members may be variously changed.

The elastic assembly 200 may be disposed between the support member 170 and the case 110. The elastic assembly 200 may extend in the vertical direction. A lower area of the elastic assembly 200 may be seated on an inner surface of the case 110, and an upper area of the elastic assembly 200 may be coupled to the lower area of the support member 170 to elastically support the compression mechanism 120 against the inner surface of the case 110.

The elastic assembly 200 may be configured such that a plurality of different elastic members 220 and 240 are disposed in the vertical direction or a longitudinal direction. Through this, the present disclosure can reduce the vertical vibration compared to using a single spring.

The elastic assembly 200 may include a plurality of elastic assemblies. The plurality of elastic assemblies may correspond to the number of the plurality of support members.

The elastic assembly 200 may include a first mounting member 230. The first mounting member 230 may be disposed between the case 110 and the support member 170. An upper part of the first mounting member 230 may support the first elastic member 220, and a lower part of the first mounting member 230 may support the second elastic member 240.

The first mounting member 230 may include a mounting portion 236. A lower surface of the first elastic member 220 may be seated on an upper surface of the mounting portion 236. An upper surface of the second elastic member 240 may be seated on a lower surface of the mounting portion 236. The mounting portion 236 may have a disk shape in which a hole is formed in its central area. For example, the mounting portion 236 may be formed in a circular strip shape.

The first mounting member 230 may include a first stopper 238. The first stopper 238 may extend upward from a radially outer side of the mounting portion 236. The first stopper 238 may be spaced from an outer surface of the first elastic member 220 in a transverse direction. The first stopper 238 may be disposed adjacent to the first elastic member 220. As a result, excessive transverse vibration of the first elastic member 220 can be suppressed.

The first stopper 238 may include a bent portion 239. The bent portion 239 may be formed in an upper area of the first stopper 238. The bent portion 239 may have an increasing radius as it goes upward. For example, an inner radius of the bent portion 239 may increase as it goes upward. The bent portion 239 may be bent radially outward in the upper area of the first stopper 238. Through this, since the first elastic member 220 can be guided to the upper surface of the mounting portion 236, the first elastic member 200 can be prevented from being excessively restrained in the transverse direction while improving assemblability of the product.

The first mounting member 230 may include a first guide member 232. The first guide member 232 may extend upward in the central area of the mounting portion 236. The first guide member 232 may be in contact with an inner surface of the first elastic member 220. As a result, the lower area of the first elastic member 220 can be stably fixed to the first mounting member 230.

A height of the first guide member 232 may be greater than a height of the first stopper 238. An upper end of the first guide member 232 may be disposed above an upper end of the first stopper 238. A lower end of the first guide member 232 may be disposed below a lower end of the second stopper 238. Through this, the spatial efficiency can be improved.

The first guide member 232 may vertically overlap with a third guide member 214 of a third mounting member 210. The upper end of the first guide member 232 may be vertically spaced from the third guide member 214. Through this, the first mounting member 230 and the third mounting member 210 can be prevented from colliding with each other.

The first guide member 232 may be configured such that a hole extending in the vertical direction is formed in a central area. The hole of the first guide member 232 may vertically overlap with a second guide member 254. An outer surface of the second guide member 254 may slide on an inner surface of the first guide member 232. Oil stored in the lower part of the case 110 may be supplied between the inner surface of the first guide member 232 and the outer surface of the second guide member 254. Through this, the present disclosure can suppress excessive transverse or horizontal vibration of the elastic assembly 200 and prevent a buckling phenomenon of the elastic assembly 200.

The first guide member 232 may include a protrusion 234. The protrusion 234 may be formed in a lower area of the first guide member 232. The protrusion 234 may protrude outward from the outer surface of the first guide member 232. The protrusion 234 may be in direct contact with the inner surface of the first elastic member 220. A lower area of the first elastic member 220 may be fitted to the protrusion 234. As a result, the lower area of the first elastic member 220 can be stably guided.

The protrusion 234 may be formed adjacent to the central area of the first guide member 232 as at least a portion of the protrusion 234 goes upward. The first embodiment of the present disclosure describes that a cross section of an upper area of the protrusion 234 is formed in a linear shape inclined toward the central area of the first guide member 232, by way of example, but it may have a radially outward convex curved shape. As a result, the assemblability of the first elastic member 210 and the first mounting member 230 can be improved.

The elastic assembly 200 may include the first elastic member 220. The first elastic member 220 may be disposed between the first mounting member 230 and the support member 170. An upper end of the first elastic member 220 may be coupled to the third mounting member 210, and a lower end of the first elasticity member 220 may be coupled to the first mounting member 230. The first elastic member 220 may be a coil spring. A diameter D1 of the first elastic member 220 may be greater than a diameter D2 of the second elastic member 240. The diameter D1 of the first elastic member 220 may be larger than a diameter of the first guide member 232 and less than a diameter of the first stopper 238. Through this, the structural stability of the elastic assembly 200 of the reciprocating compressor 100 can be improved. The stiffness of the first elastic member 220 may be less than the stiffness of the second elastic member 240.

The elastic assembly 200 may include the second elastic member 240. The second elastic member 240 may be disposed between the first mounting member 230 and the case 110. An upper end of the second elastic member 240 may be coupled to the first mounting member 230, and a lower end of the second elasticity member 240 may be coupled to a second mounting member 250. The second elastic member 240 may be a coil spring. A diameter D2 of the second elastic member 240 may be less than the diameter D1 of the first elastic member 220. The diameter D2 of the second elastic member 240 may be greater than a diameter of the second guide member 254. Through this, the structural stability of the elastic assembly 200 of the reciprocating compressor 100 can be improved. Further, the stiffness of the second elastic member 240 may be equal to or greater than the stiffness of the first elastic member 220. Through this, the deflection instability of the second elastic member 240 disposed below the first elastic member 220 can be resolved to prevent damage of the product due to buckling of the elastic assembly 200.

The elastic assembly 200 may include the second mounting member 250. The second mounting member 250 may be disposed between the second elastic member 240 and the case 110. The second elastic member 240 may be disposed on the second mounting member 250.

The second mounting member 250 may include a first flange portion 252. The first flange portion 252 may be disposed between a lower area of the second elastic member 240 and the inner surface of the case 110. A lower end of the second elastic member 240 may be seated on an upper surface of the first flange portion 252. A radial length (e.g., a horizontal length in FIG. 5) of the first flange portion 252 may be greater than a radial length of the first guide member 232 and less than a radial length of the first stopper 238. Through this, the present disclosure can improve the structural stability and can reduce the material cost.

The second mounting member 250 may include the second guide member 254. The second guide member 254 may extend upward in a central area of the first flange portion 252. The second guide member 254 may be formed in a cylindrical shape. The second guide member 254 may be disposed inside the second elastic member 240. The diameter of the second guide member 254 may be less than the diameter D2 of the second elastic member 240. An upper area of the second guide member 254 may penetrate the first guide member 232 of the first mounting member 230. Through this, the present disclosure can guide the vertical or longitudinal compression or tension of the elastic assembly.

The outer surface of the second guide member 254 may slide on the inner surface of the first guide member 232. Oil stored in the lower part of the case 110 may be supplied between the outer surface of the second guide member 254 and the inner surface of the first guide member 232. Through this, the present disclosure can suppress excessive transverse or horizontal vibration of the elastic assembly 200 and prevent the buckling phenomenon of the elastic assembly 200. In addition, the present disclosure can prevent wear of the first guide member 232 and the second guide member 254 caused by friction between the first guide member 232 and the second guide members 254.

An upper end of the second guide member 254 may be disposed below the upper end of the first guide member 232. Preferably, when the elastic assembly 200 is not in the compressed state, the upper end of the second guide member 254 may be disposed below the upper end of the first guide member 232. Through this, the present disclosure can prevent the components from colliding in the compressed state of the elastic assembly and improve the space efficiency.

The second mounting member 250 may include a convex portion 256. The convex portion 256 may be formed to be downward convex on a lower surface of the first flange portion 252. The convex portion 256 may be in direct contact with the inner surface of the case 110. A central area of the convex portion 256 may be formed as a flat surface, and a cross section of a portion of the convex portion 256 connected to the first flange portion 252 may have a curvature. Alternatively, the entire cross section of the convex portion 256 may have a curvature. Through this, the present disclosure can reduce a natural frequency during the vertical vibration of the elastic assembly 200 and improve vibration stability.

The elastic assembly 200 may include the third mounting member 210. The third mounting member 210 may be disposed between the support member 170 and the first elastic member 220. The third mounting member 210 may be disposed on the first mounting member 230.

The third mounting member 210 may include a second flange portion 212. The upper end of the first elastic member 220 may be seated on a lower surface of the second flange portion 212. The second flange portion 212 may be coupled to the support member 170. For example, the second flange portion 212 may be bolted to the lower area of the support member 170. A hole may be formed in a central area of the second flange portion 212. A diameter of the hole of the second flange portion 212 may be greater than a diameter of a hole of the third guide member 214. An outer diameter of the second flange portion 212 may be greater than the diameter D1 of the first elastic member 220. The outer diameter of the second flange portion 212 may be greater than an outer diameter of the first guide member 232.

The third mounting member 210 may include the third guide member 214. The third guide member 214 may extend downward in the central area of the second flange portion 212. A central area of the third guide member 214 may include a hole extending in the vertical direction. The hole of the third guide member 214 may vertically overlap the hole of the first guide member 232. The hole of the third guide member 214 may vertically overlap the second guide member 254. Through this, the present disclosure can prevent the components from colliding in the compressed state of the elastic assembly 200 while stably supporting an upper part of the first elastic member 220.

FIG. 6 is an exploded perspective view of an elastic assembly of a reciprocating compressor according to a second embodiment of the present disclosure. FIG. 7 is a cross-sectional view of an elastic assembly of a reciprocating compressor according to a second embodiment of the present disclosure.

The detail configuration of an elastic assembly 200 according to the second embodiment of the present disclosure, which is not described below, can be understood to be the same as the detail configuration of the elastic assemblies 200 according to the first embodiment of the present disclosure.

Referring to FIGS. 6 and 7, the elastic assembly 200 according to the second embodiment of the present disclosure may include a first mounting member 260.

The first mounting member 260 may include a mounting portion 266, a first guide member 262, a protrusion 264, and a second stopper 268.

The mounting portion 266, the first guide member 262, and the protrusion 264 according to the second embodiment of the present disclosure can be understood to be the same as the mounting portion 236, the first guide member 232, and the protrusion 234 according to the first embodiment of the present disclosure.

The second stopper 268 may extend downward from a radially outer side of the mounting portion 266. The second stopper 268 may be spaced from an outer surface of a second elastic member 240 in a radial or horizontal direction. The second stopper 268 may be disposed adjacent to the second elastic member 240. Through this, the present disclosure can suppress excessive transverse vibration of the second elastic member.

FIG. 8 is an exploded perspective view of an elastic assembly of a reciprocating compressor according to a third embodiment of the present disclosure. FIG. 9 is a cross-sectional view of an elastic assembly of a reciprocating compressor according to a third embodiment of the present disclosure.

The detail configuration of an elastic assembly 200 according to the third embodiment of the present disclosure, which is not described below, can be understood to be the same as the detail configuration of the elastic assemblies 200 according to the first embodiment of the present disclosure.

Referring to FIGS. 8 and 9, the elastic assembly 200 according to the third embodiment of the present disclosure may include a first mounting member 270. The first mounting member 270 may include a mounting portion 276, a first guide member 272, and a protrusion 274.

The mounting portion 276, the first guide member 272, and the protrusion 274 according to the third embodiment of the present disclosure can be understood to be the same as the mounting portion 236, the first guide member 232, and the protrusion 234 according to the first embodiment of the present disclosure.

That is, the elastic assembly 200 according to the third embodiment of the present disclosure can be understood as the elastic assemblies 200 according to the first embodiment of the present disclosure in which the first stopper 238 is deleted.

FIG. 10 is an exploded perspective view of an elastic assembly of a reciprocating compressor according to a fourth embodiment of the present disclosure. FIG. 11 is a cross-sectional view of an elastic assembly of a reciprocating compressor according to a fourth embodiment of the present disclosure.

The detail configuration of an elastic assembly 200 according to the fourth embodiment of the present disclosure, which is not described below, can be understood to be the same as the detail configuration of the elastic assemblies 200 according to the first embodiment of the present disclosure.

Referring to FIGS. 10 and 11, the elastic assembly 200 according to the fourth embodiment of the present disclosure may include a first mounting member 280.

The first mounting member 280 may include a mounting portion 286, a first guide member 282, a protrusion 284, a first stopper 288, a bent portion 289, and a second stopper 290.

The mounting portion 286, the first guide member 282, the protrusion 284, the first stopper 288, and the bent portion 289 according to the fourth embodiment of the present disclosure can be understood to be the same as the mounting portion 236, the first guide member 232, the protrusion 234, the first stopper 238, and the bend portion 239 according to the first embodiment of the present disclosure.

The second stopper 290 may extend downward from a radially outer side of the mounting portion 286. The second stopper 290 may be spaced from an outer surface of a second elastic member 240 in a radial or horizontal direction. The second stopper 290 may be disposed adjacent to the second elastic member 240. Through this, the present disclosure can suppress excessive transverse vibration of the second elastic member.

The second stopper 290 may be disposed closer to a central area of the first mounting member 280 than the first stopper 288. For example, an outer diameter of the second stopper 290 may be less than an inner diameter of the first stopper 288. Through this, the present disclosure can improve the space efficiency of the elastic assembly 200.

FIG. 12 is a graph illustrating an amount of deflection of a first elastic member and a second elastic member depending on stiffness of the first elastic member and the second elastic member in a reciprocating compressor according to embodiments of the present disclosure.

Referring to FIG. 12, it can be seen that when stiffness k2 of the second elastic member 240/stiffness k1 of the first elastic member 220 is less than 1, an amount of deflection of the second elastic member 240 due to the load (e.g., the compression mechanism) increases. In this case, a large amount of deflection of the second elastic member 240 disposed below the first elastic member 220 increases a risk of buckling of the elastic assembly 200. That is, the stiffness k2 of the second elastic member 240 is preferably equal to or greater than the stiffness k1 of the first elastic member 220.

FIG. 13 is a graph illustrating vibration depending on an operating speed in an existing reciprocating compressor and a reciprocating compressor according to embodiments of the present disclosure. FIG. 14 is a graph illustrating a maximum transverse displacement at the stop of an existing reciprocating compressor and a reciprocating compressor according to embodiments of the present disclosure.

Referring to FIG. 13, it can be seen that when an operating speed of the reciprocating compressor 100 according to embodiments of the present disclosure increases, maximum vertical or longitudinal vibration occurring in the reciprocating compressor 100 is reduced by 38% compared to the related art (existing technology).

Referring to FIG. 14, it can be seen that a maximum displacement in the transverse or horizontal direction, that occurs when the reciprocating compressor 100 according to embodiments of the present disclosure stops operating, is reduced by 71% compared to the prior art (existing technology).

That is, the noise of the reciprocating compressor 100 can be reduced, and the compression mechanism 120 and the case 110 can be prevented from colliding with each other through the elastic assembly 200 according to embodiments of the present disclosure.

Some embodiments or other embodiments of the present disclosure described above are not exclusive or distinct from each other. Some embodiments or other embodiments of the present disclosure described above can be used together or combined in configuration or function.

For example, configuration "A" described in an embodiment and/or the drawings and configuration "B" described in another embodiment and/or the drawings can be combined with each other. That is, even if the combination between the configurations is not directly described, the combination is possible except in cases where it is described that it is impossible to combine.

The above detailed description is merely an example and is not to be considered as limiting the present disclosure. The scope of the present disclosure should be determined by rational interpretation of the appended claims, and all variations within the equivalent scope of the present disclosure are included in the scope of the present disclosure.

The invention claimed is:

1. A reciprocating compressor, comprising:
- a case;
- a drive motor disposed in the case;
- a rotary shaft rotatably connected to the drive motor;
- a compression mechanism rotated by the rotary shaft to compress a refrigerant;
- a plurality of support members configured to support the compression mechanism; and
- a plurality of elastic assemblies, each of which is disposed between a respective support member of the plurality of support members and the case, wherein each of the plurality of elastic assemblies includes:

a first mounting member disposed between the support member and the case and including a mounting portion and a first guide member that extends upward in a central area of the mounting portion;

a first elastic member disposed between the support member and the first mounting member;

a second elastic member disposed between the first mounting member and the case;

a second mounting member disposed between the second elastic member and the case and including a first flange portion and a second guide member that extends upward in a central area of the first flange portion; and a third mounting member disposed between the first elastic member and the support member and including a second flange portion and a third guide member that extends downward in a central area of the second flange portion, wherein the first guide member and the third guide member each include a hole that extends in a vertical direction and vertically overlaps with an outer surface of the second guide member.

2. The reciprocating compressor of claim 1, wherein a stiffness of the second elastic member is equal to or greater than a stiffness of the first elastic member.

3. The reciprocating compressor of claim 1, wherein the mounting portion includes an upper surface on which a lower surface of the first elastic member is mounted and a lower surface on which an upper surface of the second elastic member is mounted, and wherein the first mounting member further includes an upward stopper that extends upward from a radially outer side of the mounting portion and is radially spaced from an outer surface of the first elastic member.

4. The reciprocating compressor of claim 3, wherein the upward stopper includes a bent portion that have an increasing radius as it extends upward.

5. The reciprocating compressor of claim 1, wherein the first mounting member includes a protrusion that protrudes radially from an outer surface of the first guide member and is in direct contact with the inner surface of the first elastic member, and wherein the protrusion is formed adjacent to a central area of the first guide member as at least a portion of the protrusion extends upward.

6. The reciprocating compressor of claim 1, wherein a lower end of the second elastic member is mounted on the first flange portion.

7. The reciprocating compressor of claim 6, wherein the second mounting member includes a convex portion that is convexly formed on a lower surface of the first flange portion and is in contact with an inner surface of the case.

8. The reciprocating compressor of claim 6, wherein an upper end of the second guide member is disposed below an upper end of the first guide member.

9. The reciprocating compressor of claim 6, wherein an upper end of the first elastic member is mounted on the second flange portion.

10. The reciprocating compressor of claim 6, wherein an oil stored in a lower portion of the case is supplied between the first guide member and the second guide member, and wherein an outer surface of the second guide member slides on an inner surface of the first guide member.

11. The reciprocating compressor of claim 3, wherein the first mounting member further includes a downward stopper that extends downward from the radially outer side of the mounting portion and is radially spaced from an outer surface of the second elastic member, and wherein the downward stopper is disposed closer to a central area of the first mounting member than the upward stopper.

12. The reciprocating compressor of claim 1, wherein the first mounting member further includes a downward stopper that extends downward from a radially outer side of the mounting portion and is radially spaced from an outer surface of the second elastic member.

13. The reciprocating compressor of claim 12, a lower end of the second elastic member is mounted on the first flange portion.

14. The reciprocating compressor of claim 13, wherein the second mounting member further includes a convex portion that is convexly formed on a lower surface of the first flange portion, and wherein the convex portion is in contact with an inner surface of the case.

15. The reciprocating compressor of claim 13, wherein an upper end of the second guide member is disposed below an upper end of the first guide member.

16. The reciprocating compressor of claim 13, wherein an upper end of the first elastic member is mounted on the second flange portion.

17. The reciprocating compressor of claim 13, wherein an oil stored in a lower portion of the case is supplied between the first guide member and the second guide member, and wherein an outer surface of the second guide member slides on an inner surface of the first guide member.

* * * * *